K. VON DREGER.
ELECTRIC ARC LAMP.
APPLICATION FILED JUNE 17, 1909.
1,026,569.
Patented May 14, 1912.
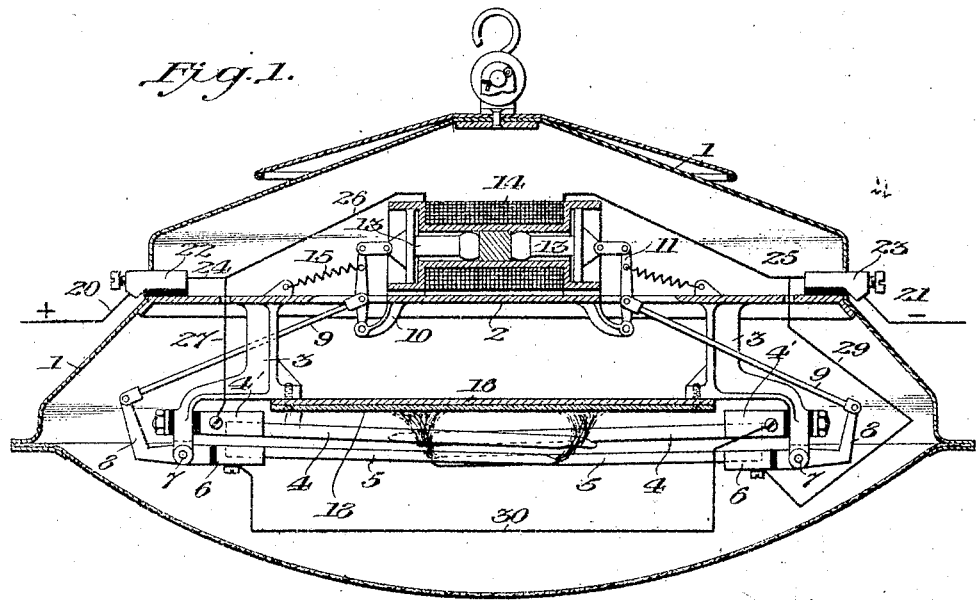

UNITED STATES PATENT OFFICE.

KARL VON DREGER, OF BERLIN, GERMANY, ASSIGNOR TO GESELLSCHAFT FÜR VERWERTUNG TECHNISCHER PATENTE BESCHRÄNKTER HAFTUNG, OF BREMEN, GERMANY.

ELECTRIC-ARC-LAMP.

1,026,569.  Specification of Letters Patent.  Patented May 14, 1912.

Application filed June 17, 1909. Serial No. 502,672.

*To all whom it may concern:*

Be it known that I, KARL VON DREGER, a subject of the Emperor of Austria-Hungary, residing in Berlin, in the Empire of Germany, have invented a new and useful Improvement in Electric-Arc Lamps, of which the following is a specification.

In arc lamps with parallel and approximately horizontal carbons, especially when impregnated or flame arc carbons are used, the voltaic arc always forms a flame which is quite pronounced. This flame burns very unsteadily and therefore causes fluctuations in the illumination. In order to avoid these fluctuations of the long flame arc in accordance with the present invention a plate of material which burns with difficulty, such as asbestos for example, is arranged a small distance above the carbon. This device, which may be termed a flameplate, extends throughout the entire effective length of the carbon. The part of the flame which would otherwise flicker greatly in the upward direction spreads out beneath the fire proof plate and burns so steadily, that fluctuations in the light, which are caused by flickering of the flame of the burning lamp, are no longer perceptible.

The accompanying drawing shows a constructional form of such a lamp.

Figure 1 is a vertical cross section of one form of my lamp taken somewhat to one side of and parallel to the carbons. Fig. 2 is a bottom view of said lamp, showing the flame plate arranged above the positive carbons, the negative carbons with their holders being omitted in this view for clearness. Fig. 3 illustrates, approximately full size, the manner in which the flame arc spreads beneath the incombustible plate. Fig. 4 is a vertical section taken on the line A—B of Fig. 3. Fig. 5 is a diagrammatic cross section, which illustrates the arrangement of the plate for carbons located in a horizontal plane; the thick positive carbon projects considerably beyond the thinner negative carbon so that the light is emitted approximately in the direction indicated by the arrows. Here also the luminous arc spreads beneath the incombustible plate.

The sheet metal casing 1 contains a horizontal plate 2 on which two carbon supporting brackets 3 are rigidly fixed. Each bracket carries two carbons which are superposed; the positive carbon 4 being somewhat longer than the negative carbon 5, so that the crater of the positive carbon 4 can project its light downward unimpeded by the negative carbon.

The positive carbons 4 are carried by metal holders 4' which are insulated from and immovably fixed on the brackets 3. The negative carbons 5 are mounted in the metallic holders 6 which are pivotally mounted at 7 in the ends of the brackets 3. The holders 6 comprise levers 8, which are outwardly directed, and are connected by rods 9 with the bifurcated levers 11, which latter are pivoted to the brackets 10.

Two iron armatures 13 are connected with the levers 11 and are capable of movement in the coil 14. The lamp is included in the circuit by means of the wires 20, 21 which are connected to pieces 22, 23, the latter being rigidly but insulatedly secured to the lamp. Within the casing of the lamp, two wires 24, 25 are connected to the pieces 22, 23 and each of these wires has two branches 26, 27 and 28, 29, respectively. When the lamp is switched off, the springs 15 pull the armatures 13 outwardly, so that by the intermediary of the parts 8, 9 and 11, the free ends of the negative carbons 5 move upwardly into contact with the ends of the positive carbons 4.

When the lamp is switched in, the current passes immediately through the wires 20, 24, 26, the electro-magnet 14, the wires 28, 25 and 21, and at the same time through wire 27, the left hand carbons 4 and 5, then through the wire 30 to the right hand carbons, thence through the second carbon 5 and finally through wire 29 to the wire 25. Accordingly the two armatures are drawn into the coil 14 thus extending the springs 15 slightly and by means of the parts 8, 9 and 11, the negative carbons 5 are moved in such a manner that they no longer contact with the positive carbons 4, whereby the arc is struck in the known manner. At a distance above the positive carbon, (which distance may be equal to the diameter of this carbon) a strong plate 16 of iron or some other appropriate material is arranged; by means of the support 17 this plate is immovably connected with the said frame plate 2 of the lamp. On the under side of this plate 16 a layer of asbestos 18 or some other appropriate material of appropriate thickness is provided. The luminous arc extending upward above the carbon 4 spreads against this incombustible layer 18 approximately as shown in Figs. 3 and 4, whereby as already stated, any prejudicial flickering is rendered substantially impossible.

I claim:

A flaming arc lamp comprising two pairs of carbons, each pair arranged substantially horizontal, one carbon of each pair being above the other carbon of said pair, said pairs of carbons having their respective burning tips oppositely directed, the burning tips of the upper carbons normally projecting beyond the corresponding burning tips of the lower carbons, and a plate for steadying the flaming arcs developed between said carbons, said plate disposed above the upper carbons and being out of contact therewith.

In witness whereof I have hereunto set my hand this first day of June 1909 in the presence of two subscribing witnesses.

KARL von DREGER.

Witnesses:
 WOLDEMAR HAUPT,
 HENRY HASPER.